(12) United States Patent
Takezawa et al.

(10) Patent No.: US 8,256,322 B2
(45) Date of Patent: Sep. 4, 2012

(54) STEERING APPARATUS

(75) Inventors: Naoyuki Takezawa, Gunma-ken (JP); Yoshiyuki Satou, Gunma-ken (JP)

(73) Assignee: Yamada Manufacturing Co., Ltd., Kiryu-Shi, Gunma-Ken (JP)

( * ) Notice: Subject to any disclaimer, the term of this patent is extended or adjusted under 35 U.S.C. 154(b) by 258 days.

(21) Appl. No.: 12/659,990

(22) Filed: Mar. 26, 2010

(65) Prior Publication Data

US 2010/0242663 A1 Sep. 30, 2010

(30) Foreign Application Priority Data

Mar. 30, 2009 (JP) ................. 2009-083548
Feb. 5, 2010 (JP) ................. 2010-024799

(51) Int. Cl.
*B62D 1/18* (2006.01)
(52) U.S. Cl. .......................... 74/493; 280/775
(58) Field of Classification Search .............. 74/493; 280/775
See application file for complete search history.

(56) References Cited

U.S. PATENT DOCUMENTS 5,669,634 A * 9/1997 Heinzman et al. ............ 280/777
5,899,497 A * 5/1999 Spencer et al. ............... 280/775
7,354,069 B2 * 4/2008 Yamada ........................ 280/775
7,401,813 B2   7/2008 Sawada et al.
7,497,472 B2 * 3/2009 Cymbal et al. ............... 280/779
2006/0028010 A1  2/2006 Yamada
2006/0214410 A1  9/2006 Sawada et al.

FOREIGN PATENT DOCUMENTS

DE   10 2006 040 318 B3   2/2008
JP   2001-347953          12/2001
WO   WO 2004/085225 A1   10/2004
WO   WO 2009/013457 A1    1/2009

OTHER PUBLICATIONS

European Search Report dated Jul. 27, 2010.

* cited by examiner

*Primary Examiner* — Justin Krause
(74) *Attorney, Agent, or Firm* — McGinn IP Law Group, PLLC

(57) ABSTRACT

A steering apparatus includes a fixed bracket, an outer column, an arm unit, an inner column, a steering shaft, and a tightening tool. The outer column includes a main holding body portion, a divided portion, and a tightening portion. The arm unit includes by a bifurcated arm portion that extends axially outward in a substantially bifurcated shape at the axial front side of the main holding body portion and a linking portion formed between the arms of the bifurcated arm portion. The inner column is held by the outer column. The steering shaft is pivotally supported by the linking portion. Two tightening plate pieces of the tightening portion are disposed inside two fixed side portions of the fixed bracket and tightenably connected by the tightening tool.

18 Claims, 11 Drawing Sheets

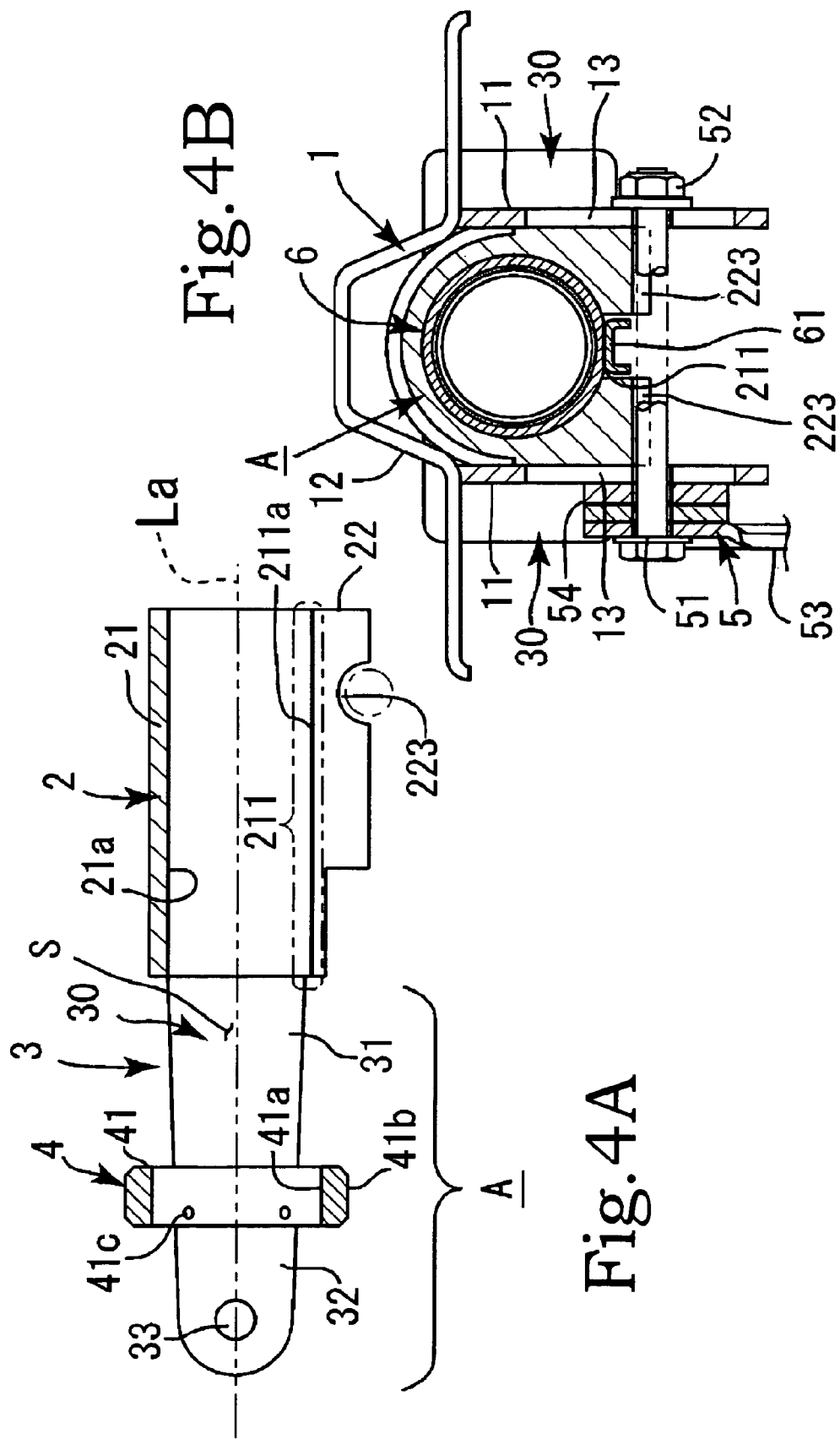

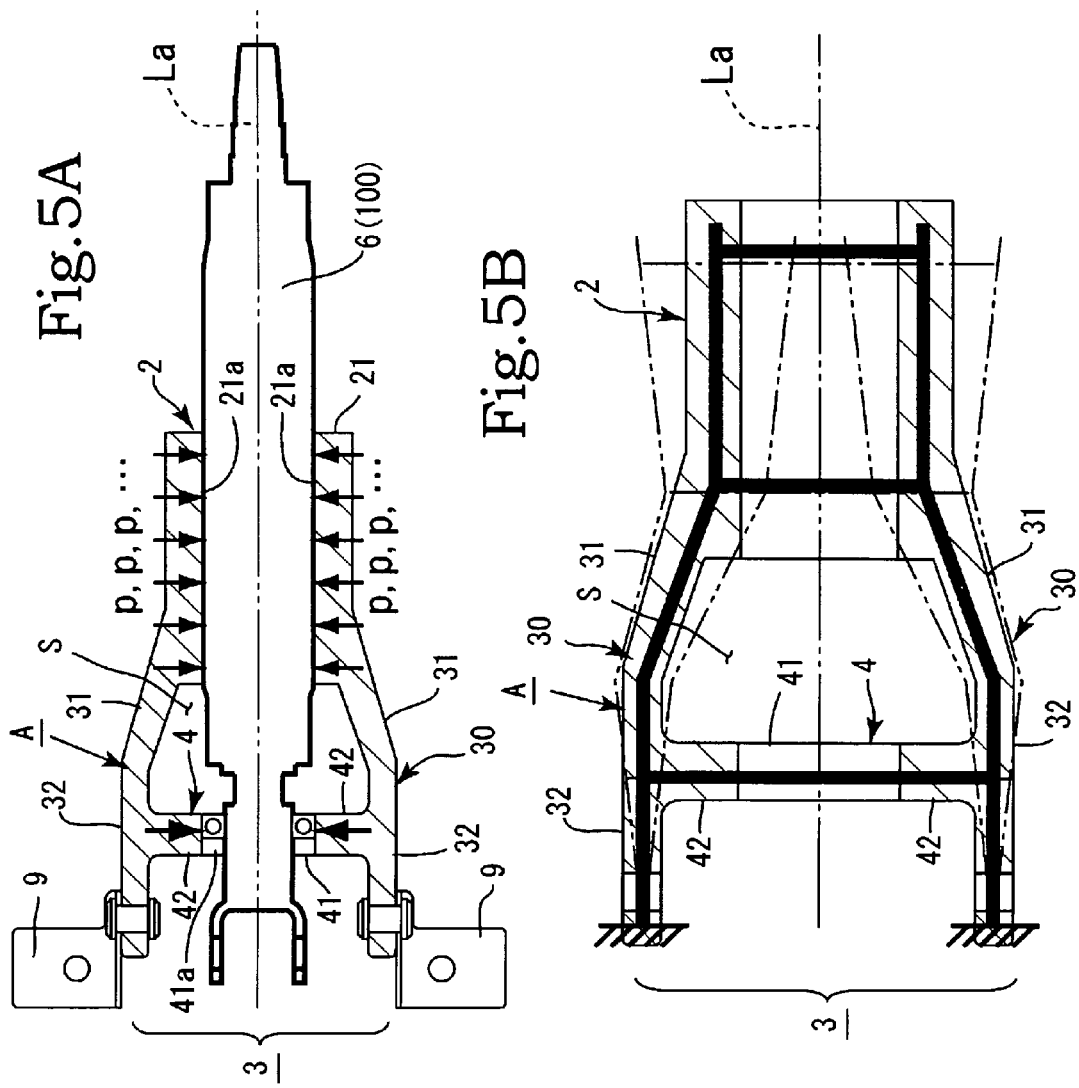

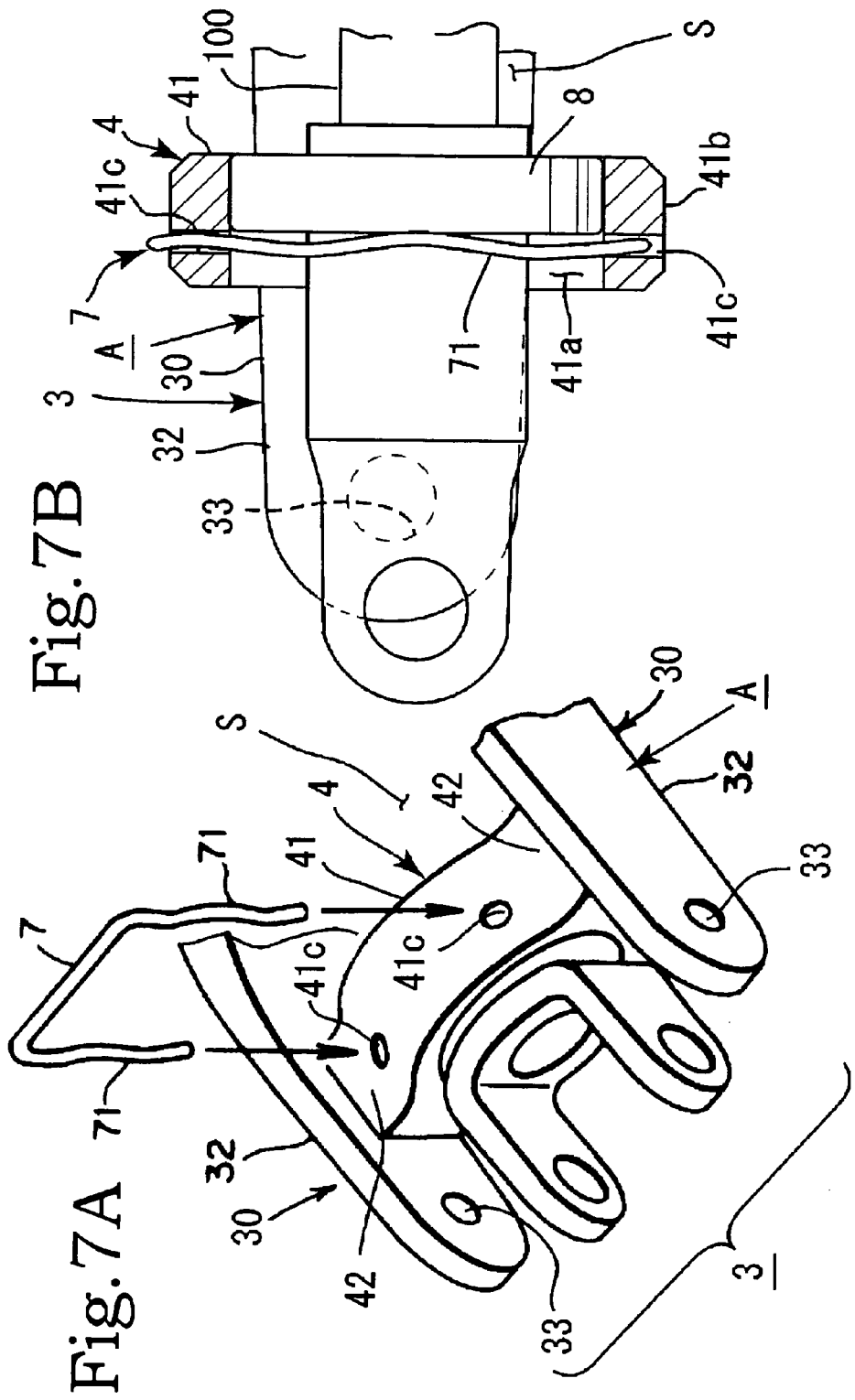

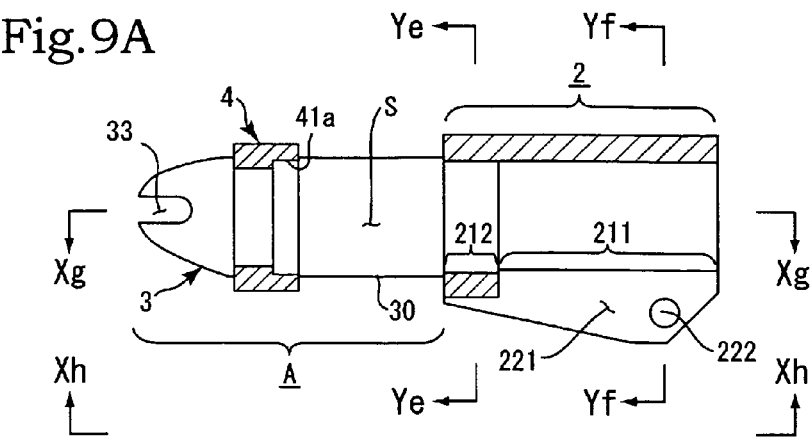

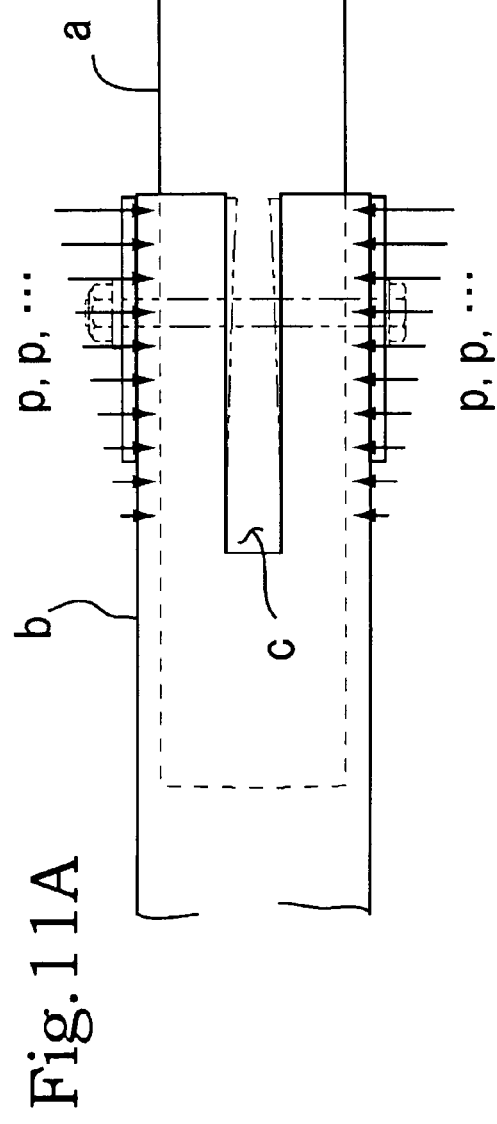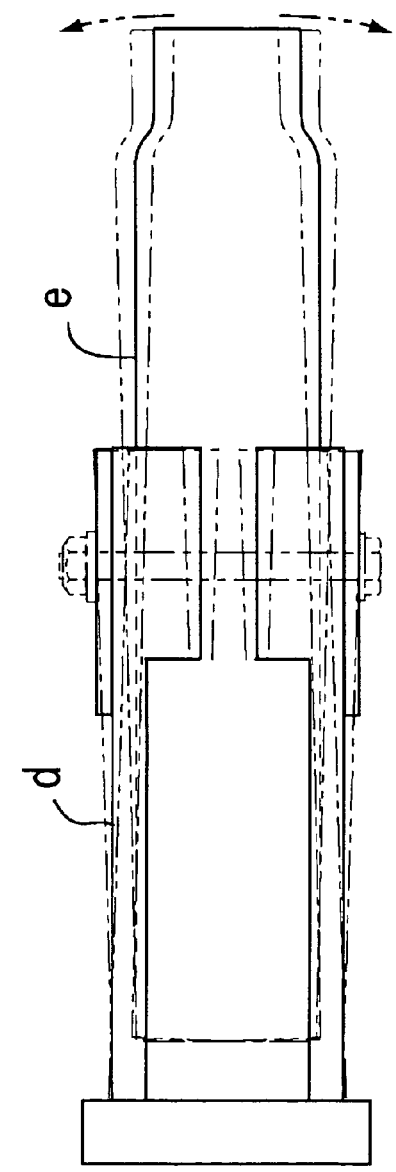
Fig.11A
Fig.11B

STEERING APPARATUS

BACKGROUND OF THE INVENTION

1. Technical Field

The present invention relates to a steering apparatus which has increased rigidity in a fixed state of a steering column after positioning performed by tilt and telescopic adjustment and in which a play is inhibited and operation feeling of steering is improved.

2. Description of the Related Art

There are various steering apparatuses equipped with a tilt and telescopic adjustment mechanism. One of the typical structures of such steering apparatus is constituted by a fixed bracket mounted on a vehicle side, an inner column that rotatably supports a steering shaft, a steering support body that axially slidably supports the inner column, and a tightening means for tightening the inner column via the steering support body by tightening the fixed bracket.

It is especially important that the steering apparatus have good rigidity at the time of fixing in the correct position after the respective correct position has been determined in tilt and telescopic adjustment. For this purpose, efforts have been made to inhibit a play of a handle when a bending load acts upon the handle, that is, when a twisting force acts upon the handle in the up-down direction. The related art of this kind is disclosed in Japanese Patent Application Laid-open No. 2001-347953 and Republication of International Patent Application WO2004-085225.

The configuration disclosed in Japanese Patent Application Laid-open No. 2001-347953 will be described below. For the sake of convenience, reference symbols will be assigned to the principal components. An upper-side inner column (a) is axially slidably enclosed in and held by a lower-side outer column (b), and the inner column (a) is tightened via the outer column (b) by tightening plate portions on the opposite sides. A steering shaft is constituted by an upper shaft and a lower shaft that are joined so that they can slide with respect to each other in the front-rear direction of the vehicle, and the upper shaft and lower shaft are rotatably supported by the inner column (a) and outer column (b) respectively.

A pair of clamp members are provided outside the lower-side outer column (b) so as to enclose and hold the upper-side inner column (a), and an axial slot (c) is provide in the location where the pair of clamp members have been provided. No slot (c) is provided and a tubular shape is formed in other zones. The pair of clamp members are brought close to each other by a tightening bolt and the width of the slot (c) is reduced, whereby the upper-side inner column (a) is enclosed, held, and tightened by the pair of clamp members. Therefore, in Japanese Patent Application Laid-open No. 2001-347953, since the upper-side inner column (a) is directly tightened by the lower-side outer column (b), the rigidity of the two columns with respect to the vehicle body and the fixed bracket of the vehicle body can be increased.

However, Japanese Patent Application Laid-open No. 2001-347953 discloses a structure in which one side of the outer column (b), in which the slot (c) has been formed, along the axial direction of the column, that is, the axial end side of the outer column (b), is opened so as to be open axially to the outside, and an end portion of the slot (c) that is closed like a dead end is present at the central side in the axial direction of the outer column (b). As a result, the pushing pressures p, p, . . . by which the clamp members tighten the inner column (a) weaken gradually with the distance from the position of the tightening bolt in the axial direction of the inner column (a), and the pushing pressures p, p, . . . are practically not generated in the central zone in the axial direction that is the end portion of the slot (c) closed like a dead end. Therefore, the pushing force varies along the axial direction of the inner column (a) (see FIG. 11A).

Further, in order to enable the telescopic sliding of the steering shaft, a certain gap has to be provided between the outer column (b) and inner column (a) to facilitate the mutual sliding thereof. As a result, even when the steering column is fixed in the tilt-telescopic position, a play occurs in the gap. The holding force of the outer column (b) that holds the inner column (a) and steering shaft can be decreased and the rigidity of the steering column with respect to the vehicle body can be reduced.

The tilt-telescopic steering apparatus disclosed in Republication of International Patent Application WO2004-085225 will be described below. In this apparatus, an inner column is axially movably supported by an outer jacket (d) that is supported on an upper bracket disposed at the vehicle body, and the inner column is tightened by a tightening means via the outer jacket (d), whereby a steering shaft is fixed in an adjustment position. A slot is provided in the outer jacket (d) along the entire axial length thereof. The steering shaft is constituted by an upper steering shaft and a lower steering shaft joined by a universal joint in the front-rear direction of the vehicle. The upper steering shaft is rotatably supported by the inner column. The outer jacket (d) extends in the axial direction of steering, and a clamp portion that supports the inner column from the outer circumferential side is formed integrally with the rear end of the side portion at the rear side of the vehicle.

Because the slit has a shape opened at both ends along the axial direction of the inner column, that is, a double-split shape, the variation of the force created by the clamp portions to tighten the inner column can be inhibited by comparison with a structure in which a portion of the slit is closed, for example, as described in Japanese Patent Application Laid-open No. 2001-347953. Further, the outer jacket (d) supports only the inner column, without supporting the steering shaft, and when the tilt-telescopic tightening is performed, surface contact is attained in a state in which no gap is present between the outer jacket (d) and inner column, and the inner column is pushed, supported and fixed. Therefore, the tightening force of the inner column with respect to the outer jacket (d) is further increased.

However, in the configuration described in Republication of International Patent Application WO2004-085225, the slit of the outer jacket (d) is formed axially from one side to the other side and there are absolutely no zones that are continuous in the circumferential direction of the outer jacket (d). As a result, the rigidity of the outer jacket (d) itself in the configuration described in Republication of International Patent Application WO2004-085225 is reduced by comparison with that in the case of an outer column in which a cylindrical portion continuous in the circumferential direction is present because one end of the slit in the axial direction is closed, as in the aforementioned configuration disclosed in Japanese Patent Application Laid-open No. 2001-347953.

A structure in which a universal joint between an upper steering shaft and a lower steering shaft is moved in a substantially front-rear direction with respect to a vehicle body to move a steering column in the front-rear direction is called a telescopic structure of a universal joint movement type, and a structure in which a steering column is moved in the front-rear direction by extending and contracting a steering shaft, without changing the position of the universal joint with respect to the vehicle body, is called a telescopic structure of a steering column movement type. The structure described in Republication of International Patent Application WO2004-085225 is of the universal joint movement type and no bearing support portion is present on the outer jacket (d). Therefore, when the structure is changed to that of the steering column movement type in order to improve the operation feeling, separate parts have to be added. The resultant drawback is that the increase in the number of parts and assembling operations raises the cost.

SUMMARY OF THE INVENTION

Therefore, the decrease in rigidity of the outer jacket (d) when the tilt-telescopic position of the steering column (e) is fixed causes a play of the steering column (e) and the rigidity of the steering column (e) with respect to the vehicle body decreases (see FIG. 11B). Accordingly, it is an object (technical problem) of the present invention to increase the rigidity of the steering column when a tilt-telescopic position is fixed and inhibit a play of the steering column in a steering apparatus equipped with a tilt and telescopic adjustment mechanism, thereby improving the operation feeling of steering.

The inventors have conducted a comprehensive research aimed at the resolution of the above-described problems. The results obtained demonstrated that the problems can be resolved by a steering apparatus according to the invention, including a fixed bracket having fixed side portions at both sides in a widthwise direction, an outer column that is swingably mounted on the fixed bracket, an arm unit, an inner column, a steering shaft that is rotatably mounted on the arm unit and the inner column, and a tightening tool, wherein the outer column is constituted by a main holding body portion formed in a substantially hollow cylindrical shape, a divided portion that is formed along an axial direction of the main holding body portion, and a tightening portion comprising two tightening plate-like pieces formed in both side locations in a widthwise direction of the divided portion; the arm unit is constituted by a bifurcated arm portion that extends axially outward in a substantially bifurcated shape at an axial front side of the main holding body portion, and a linking portion formed between arms of the bifurcated arm portion; the inner column is held by the outer column; the steering shaft is pivotally supported by the linking portion, and the two tightening plate-like pieces of the tightening portion are disposed inside the two fixed side portions of the fixed bracket and tightenably connected by the tightening tool.

In accordance with the invention, the above-described problems can be resolved by the steering apparatus in which a pivotal support portion serving as a tilt rotation center is provided in the bifurcated arm portion of the arm unit, a bearing portion is provided in the linking portion so as to be coaxial with the main holding body portion, an open cavity portion is provided between the outer column, the bifurcated arm portion, and the linking portion, the steering shaft is constituted by an upper shaft that is rotatably supported by the inner column and a lower shaft that is rotatably supported by the linking portion, the upper shaft and lower shaft being mated and joined so as to be axially slidable with each other, a mating location of the lower shaft and an axial front end portion of the upper shaft is positioned in the open cavity portion, and an axial front end portion of the inner column can move axially in the location of the open cavity portion.

In accordance with the invention, the above-described problems can be resolved by the steering apparatus in which the divided portion is formed over the entire main holding body portion in the axial direction thereof. In accordance with the invention, the above-described problems can be resolved by the steering apparatus in which the divided portion is formed from one end side to the other end side in the axial direction of the main holding body portion except for a portion of the main holding body portion, and a circumferential support portion with an inner wall surface continuous in the circumferential direction is formed at the other end portion in the axial direction of the main holding body portion.

In accordance with the invention, the above-described problems can be resolved by the steering apparatus in which the bifurcated arm portion is formed so that the spacing thereof gradually increases axially outward from an axial end portion of the outer column. In accordance with the invention, the above-described problems can be resolved by the steering apparatus in which a rotation stop member that is inserted into the divided portion and is free to slide is fixedly attached to a diametrically lower portion of the inner column. In accordance with the invention, the above-described problems can be resolved by the steering apparatus in which a tightening through hole for the tightening tool is formed in the tightening portion. In accordance with the invention, the above-described problems can be resolved by the steering apparatus in which a guiding groove for the tightening tool is formed in a lower end surface of the tightening portion.

In accordance with the invention, the inner column is held in the main holding body portion of the outer column and the steering shaft is pivotally supported by the connection portion of the inner column and arm unit. Therefore, a more stable support can be performed in the axial direction, and even when a bending load acts upon the steering wheel, the steering shaft can be strongly held, and the operation feeling of steering can be improved.

Further, the bifurcated arm portion that protrudes axially outward of the outer column from an axial end portion of the outer column is formed in the arm unit, and the linking portion that is formed integrally with the bifurcated arm portion is present between the arms of the bifurcated arm portion. Therefore, the rigidity in the substantially horizontal diametrical direction can be increased and axially divided portions of the bifurcated arm portion can be reinforced. Thus, the bifurcated arm portion and the linking portion formed integrally between the arms of the bifurcated arm portion constitute a substantially truss-like skeletal structure of the outer column, the outer column, the arms of the bifurcated arm portion, and linking portion reinforce each other, the rigidity thereof can be increased, and the rigidity of the steering apparatus can be increased. Therefore, the rigidity of the steering column when a tilt-telescopic position is fixed is increased and a play of the steering column is inhibited, thereby improving the operation feeling of steering.

In accordance with the invention, the open cavity portion is formed between the outer column, arms of the bifurcated arm portion, and linking portion, and the inner column can move axially in the location of the open cavity portion. As a result, the opening in the axial front portion of the upper shaft can slidingly move in the axial center portion along the lower shaft, the effect of the axial center displacement of the lower shaft and upper shaft is reduced, and the deterioration of slidability can be prevented. Further, the length of the sliding portion relative to that of the inner column can be decreased, a processing region can be reduced, and cost can be reduced. In addition, the steering apparatus can be reduced in weight.

In accordance with the invention, the divided portion is formed over the entire main holding body portion in the axial direction thereof. Therefore, when the inner column is tightened and fixed by the outer column, a pushing force that tightens the outer circumference of the inner column from both horizontal diametrical sides of the outer column along the divided portion can be made substantially uniform in the axial direction. Therefore, the unevenness of the tightening force in the axial direction of the outer column can be inhibited and the tightening force can be made uniform along the axial direction. Therefore, the unevenness of the tightening force in the axial direction of the outer column can be inhibited and the tightening force can be made uniform along the axial direction.

Thus, as described above, by forming the divided portion that is entirely divided along the axial direction, it is possible to bring the two tightening plate-like pieces at both ends in the widthwise direction (horizontal diametrical direction of the outer column) of the divided portion closer to each other in a parallel state thereof, without displacement. As a result, the outer column can be fixed to the inner column uniformly over the entire range from the axially front side to the axially rear side, the columns can be fixed with higher stability, and the tightening force thereof can be further increased.

In accordance with the invention, the divided portion is formed from one end side to the other end side in the axial direction of the main holding body portion except for a portion of the main holding body portion, and a circumferential support portion with an inner wall surface continuous in the circumferential direction is formed at the front end portion in the axial direction of the main holding body portion. As a result, the rigidity in sliding support of the inner column by the main holding body portion in the outer column can be increased, a portion of the inner column that is positioned in the open cavity portion is supported by an annular frame body constituted by the front circumferential support portion, arm portions, and linking portion, strains and deformation of the inner column inside the open cavity portion region can be prevented, slidability of the inner column can be increased, and the rigidity of the entire steering apparatus can be increased.

In accordance with the invention, the bifurcated arm portion is formed so that the spacing thereof gradually increases axially outward from an axial end portion of the outer column. As a result, in a steering support body, a skeletal structure of a substantially trapezoidal shape is constituted by the outer column, bifurcated arm portion having two arms, and linking portion and a stronger structure can be obtained. In accordance with the invention, the unnecessary axial rotation of the inner column during the telescopic adjustment can be prevented. As a result, the telescopic adjustment can be performed without a play. In accordance with the invention, a tightening through hole is formed in both tightening pieces of the tightening portion. Therefore, by inserting a bolt of the tightening tool, it is possible to combine the principal structural components by assembling with the tightening tool. Further, in accordance with the invention, a guiding groove portion for the tightening tool is formed in the lower end surface of the tightening portion, thereby making it possible to reduce the outer column in size and weight.

BRIEF DESCRIPTION OF THE DRAWINGS

FIG. 4A is a vertical sectional view illustrating another embodiment of the steering support body, and FIG. 4B is a front view with a partial section illustrating an embodiment in which the steering support body of another embodiment is mounted on the fixed bracket;

FIG. 5A is an operation diagram illustrating a state in which the inner column and steering shaft are tightened by the steering support body in accordance with the present invention, and FIG. 5B is a schematic drawing illustrating a rigid structure of the steering support body;

FIG. 7A is a perspective view of a linking portion and a circlip, and FIG. 7B is a principal vertical sectional view illustrating a state in which the circlip is mounted on the linking portion;

FIG. 9A is a vertical sectional view of the steering support body provided with a circumferential support portion, FIG. 9B is a sectional view taken along the Xg-Xg arrow in FIG. 9A, FIG. 9C is a sectional view taken along the Xh-Xh arrow in FIG. 9A, FIG. 9D is a sectional view taken along the Ye-Ye arrow in FIG. 9A, and FIG. 9E is a sectional view taken along the Yf-Yf arrow in FIG. 9A;

FIG. 11A is a schematic drawing illustrating a configuration according to the related art, and FIG. 11B is a schematic drawing illustrating another configuration according to the related art.

DESCRIPTION OF THE PREFERRED EMBODIMENTS

Figure 1A:
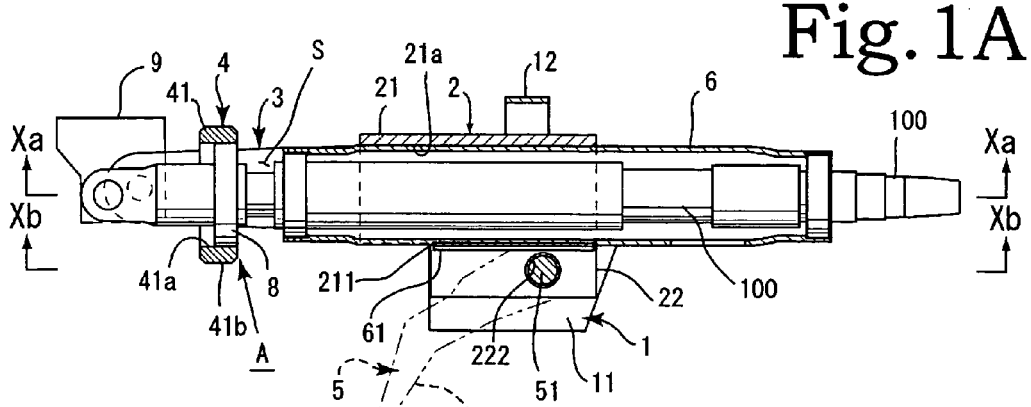
FIG. 1A is a vertical sectional view of the configuration in accordance with the present invention.

Embodiments of the present invention will be described below with reference to the appended drawings. As shown in FIG. 1 and FIG. 2, a principal configuration in accordance with the present invention includes a fixed bracket 1, an outer column 2 that is swingably mounted on the fixed bracket 1, an arm unit A, a tightening tool 5, an inner column 6, and a steering shaft 100. The fixed bracket 1 is constituted by fixed side portions 11, 11 formed at both sides in the widthwise direction and an attachment top portion 12. Adjustment holes 13, 13 that extend in a substantially up-down direction or vertical direction are formed in the two fixed size portion 11, 11 (see FIG. 2A). The attachment top portion 12 is mounted on a predetermined position inside a vehicle, with a capsule member being interposed therebetween, and can absorb impact energy during collision.

Figure 2A:
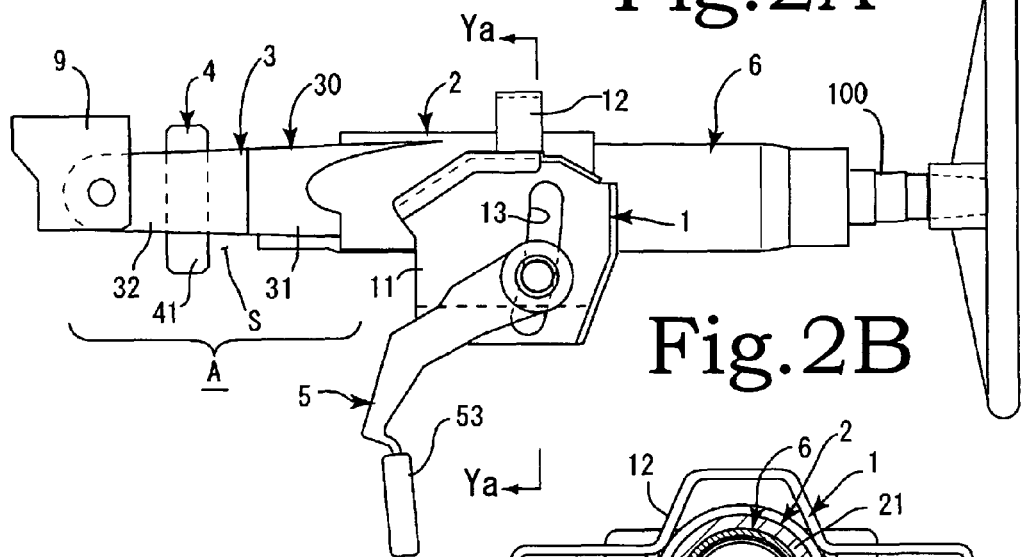
FIG. 2A is a side view of the configuration in accordance with the present invention.
Figure 2B:
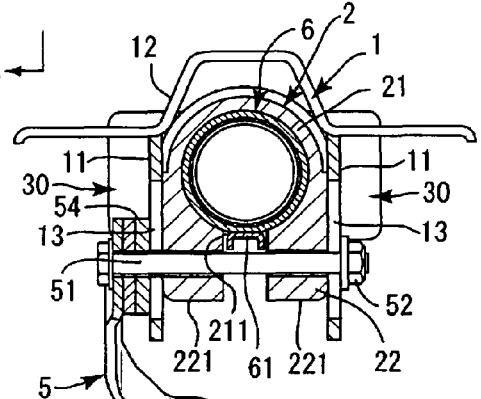
FIG. 2B is a sectional view taken along the Ya-Ya arrow in FIG. 2A.
Figure 2C:
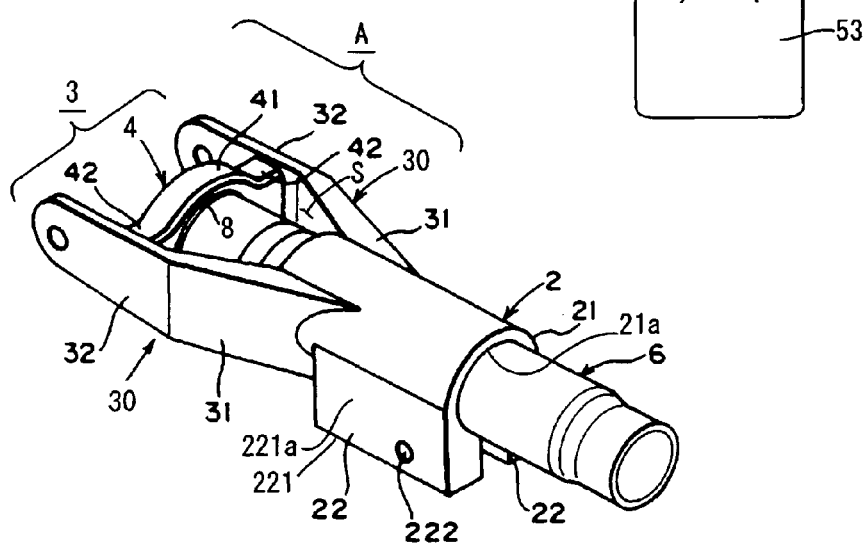
FIG. 2C is a perspective view illustrating a state in which an inner column is mounted on a steering support body.
Figure 3A:
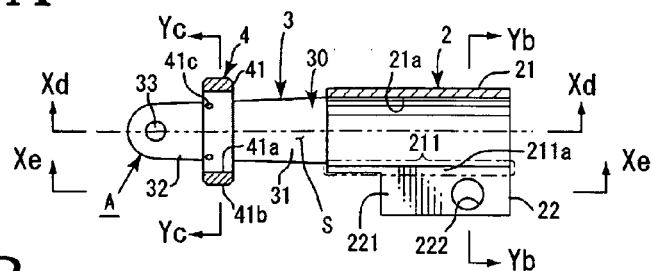
FIG. 3A is a vertical sectional view of the steering support body.
Figure 3B:
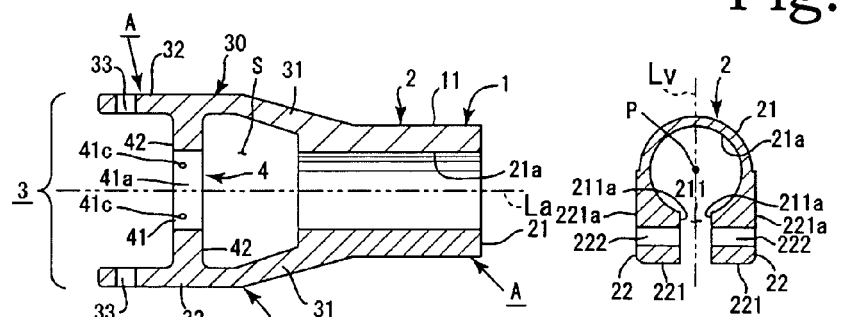
FIG. 3B is a sectional view taken along the Xd-Xd arrow in FIG. 3A.
Figure 3D:
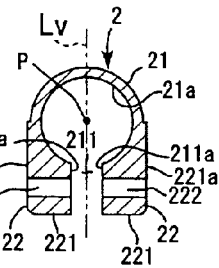
FIG. 3D is a sectional view taken along the Yb-Yb arrow in FIG. 3A.
Figure 3C:
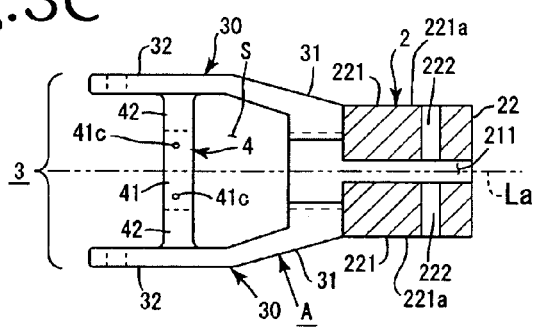
FIG. 3C is a sectional view taken along the Xe-Xe arrow in FIG. 3A.
Figure 3E:
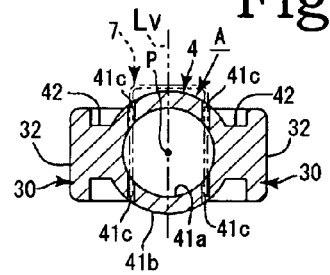
FIG. 3E is a sectional view taken along the Yc-Yc arrow in FIG. 3A.
Figures 3F, 3G:
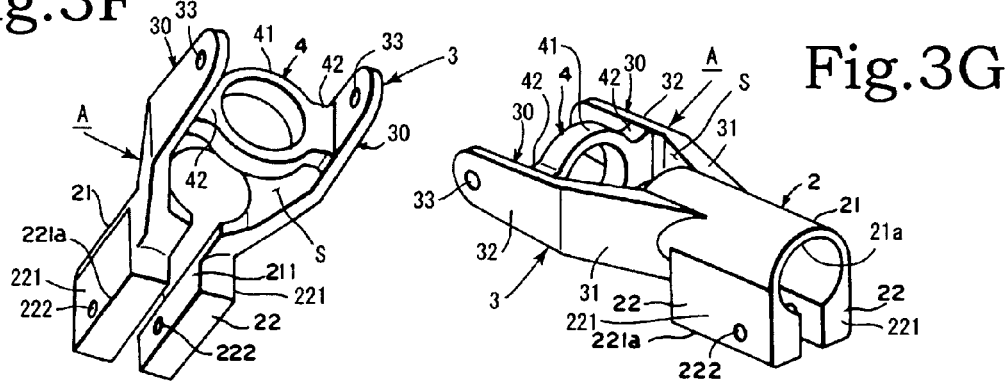
FIG. 3F is a perspective view from the front side of the steering support body.
FIG. 3G is a perspective view from the rear side of the steering support body.
Figure 6A:
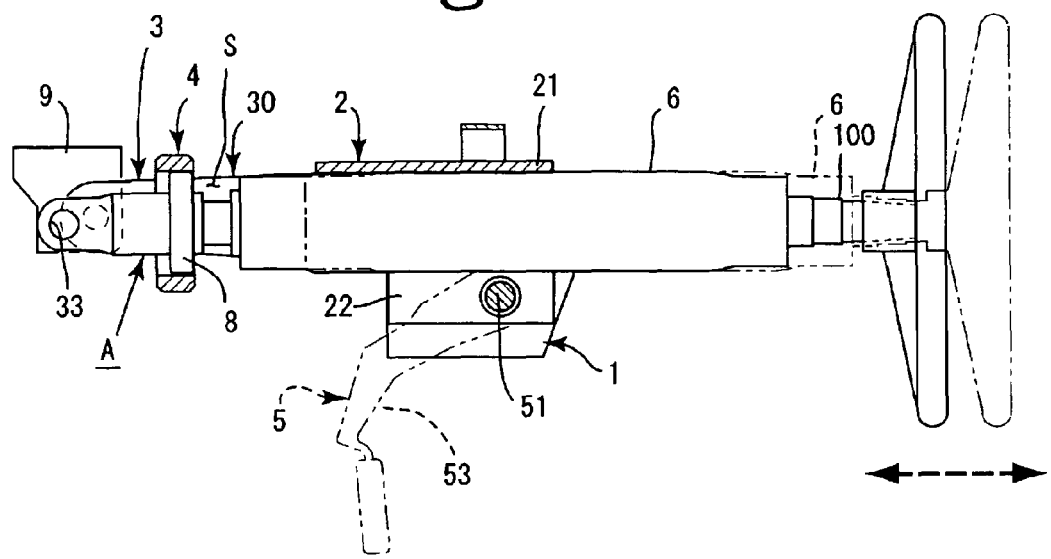
FIG. 6A is a side view with a partial section illustrating the telescopic adjustment in accordance with the present invention.
Figure 6B:
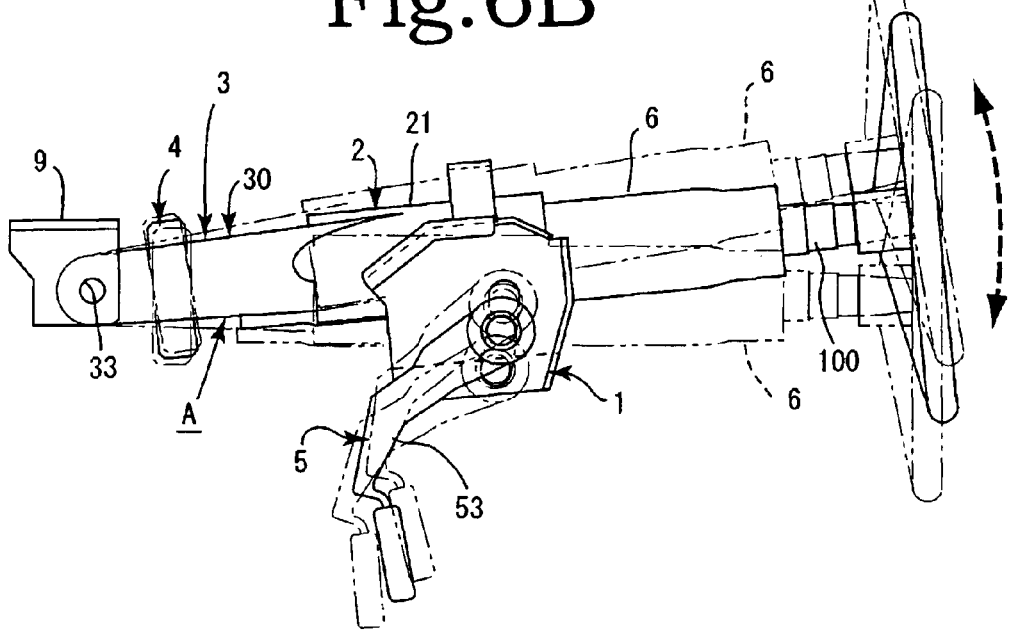
FIG. 6B is a side view illustrating the tilt adjustment in accordance with the present invention.

As shown in FIG. 2C and FIG. 3, the arm unit A is constituted by a bifurcated arm portion 3 and a linking portion 4. The outer column 2 is constituted by a main holding body portion 21 and a tightening portion 22. As shown in FIG. 3, the main holding body portion 21 is formed in a substantially cylindrical shape with a hollow inner side. More specifically, the inside of the main holding body portion has a holding inner circumferential side surface portion 21a that is formed to have a hollow shape and serves to hold the below-described inner column 6. The main holding body portion 21 is formed to be slightly larger than the outer diameter of the inner column 6. Further, the main holding body portion 21 is formed to have a length that makes it possible to support a substantially intermediate zone of the inner column 6 in the axial direction thereof in an appropriate axial direction, and the inner column 6 protrudes from the front end portion and axial rear end portion of the main holding body portion 21. A divided portion 211 is formed at the diametrically lower side of the main holding body portion 21 (see FIGS. 3C, 3D, and 3F). The front-rear direction as referred to herein is a direction corresponding to the front-rear direction of an automobile in a state in which the steering apparatus is mounted on the automobile.

The divided portion 211 is a portion in which the entire main holding body portion 21 or part thereof is divided from the axial front side towards the rear side (see FIGS. 3A and 3F), and this divided portion is formed as a slit extending along the axial direction of the main holding body portion 21. Edge portions at both sides of the divided portion 211 in the axial direction are divided end edges 211a, 211a. The two divided end edges 211a, 211a have a flat surface shape along the axial direction, and by bringing them closer to each other, it is possible to decrease the diameter of the holding inner circumferential side surface portion 21a and tighten and lock (fix) the inner column 6 that has been accommodated and mounted inside the main holding body portion 21. As for the spacing of the divided portion 211, because the two divided end edges 211a, 211a are parallel (includes also "substantially parallel") to each other, the spacing is uniform (includes also "substantially uniform") along the axial direction.

Two structural embodiments of the outer column 2 are possible. In the first embodiment, as shown in FIGS. 1 to 5, the divided portion 211 is formed over the entire main holding body portion 21 in the axial direction thereof. Thus, the divided portion 211 is formed over the entire holding inner circumferential side surface portion 21a in the axial direction thereof and can be expanded diametrically in any location in the axial direction of the holding inner circumferential side surface portion 21a. In the second embodiment of the outer column 2, as shown in FIGS. 8 to 10, the divided portion 211 is formed from one end side to the other end side in the axial direction of the main holding body portion 21, except for a portion of the main holding body portion.

A circumferential support portion 212 with a continuous inner wall surface in the circumferential direction is present at the other axial end portion of the main holding body portion 21. The circumferential support portion 212 has an endless cylindrical or annular configuration in which no divided region is present. The circumferential support portion 212 is formed in the end portion location at the front side of the main holding body portion 21. The inner column 6 is configured to be capable of sliding smoothly with respect to the circumferential support portion 212 in the axial direction thereof. More specifically, the inner diameter of the circumferential support portion 212 is slightly larger than the outer diameter of the inner column 6.

As shown in FIGS. 3A, 3D, 3F, and 3G, the tightening portion 22 is integrally formed at the lower portion of the outer column 2. The tightening portion 22 is constituted by a two tightening plate-like pieces 221, 221 in the form of substantially rectangular parallelepipeds. The tightening plate-like pieces 221, 221 have a left-right symmetrical shape and are integrally formed in positions of two divided end edges 211a, 211a of the divided portion 211.

The tightening plate-like pieces 221, 221 of the tightening portion 22 have a widthwise size from positions directly below the two divided end edges 211a, 211a to positions of diametrically horizontal two ends of the main holding body portion 21 and are formed to extend perpendicular downward from diametrically horizontal two ends of the main holding body portion 21. Further, the tightening plate-like piece 221 is formed to have a quadrangular shape such as rectangular or square shape as viewed from a side surface along the axial direction of the outer column 2.

The total widthwise size of the tightening portion 22 (tightening plate-like pieces 221, 221) is substantially equal to the diameter of the outer circumference of the main holding body portion 21. Further, the tightening portion 22 can be also formed to have a widthwise size that is slightly larger than the outer circumferential diameter of the main holding body portion 21. A surface on the outer side of the tightening plate-like pieces 221, 221 is called an outer side surface 221a. The outer side surface 221a is a flat surface so configured that the fixed side portion 11 can be brought into surface contact (includes also "almost surface contact") with the outer side surface 221a of the tightening plate-like piece 221 in a state in which the tightening plate-like pieces 221, 221 of the tightening portion 22 are clamped by the two fixed side portions 11, 11 of the fixed bracket 1.

Tightening through holes 222, 222 are formed in the tightening plate-like pieces 221, 221 in the direction perpendicular to the axial direction of the outer column 2 and in the direction parallel to the horizontal diameter direction of the main holding body portion 21. As shown in FIGS. 3B, 3C, 3F, and 3G, the arm unit A is formed at the axial front side of the main holding body portion 21. As mentioned hereinabove, the arm unit A is constituted by the bifurcated arm portion 3 and the linking portion 4. More specifically, two arms of the bifurcated arm portions 3 are formed from the axial front side of the main holding body portion 21.

In the arm unit A, the arms of the bifurcated arm portion 3 are formed so that the positions at both diametrically horizontal sides of the main holding body portion 21 serve as attachment base portions thereof. Further, the bifurcated arm portion 3 is formed to extend from an axial end portion of the outer column 2 outward on the axial front side of the outer column 2 (see FIGS. 3A, 3B, and 3C). The bifurcated arm portion 3 is constituted by two arm pieces 30, 30. The two arm pieces 30, 30 are formed with a left-right symmetry so as to face outward on the axial front side of the outer column 2 and so that the distance between the two arm pieces 30, 30 expands gradually in the forward direction.

The arm pieces 30, 30 of the bifurcated arm portion 3 are constituted by intermediate arm pieces 31, 31 with a distance therebetween increasing gradually and end arm pieces 32, 32 that are parallel to each other and extend further along the axial direction of the main holding body portion 21 from the outer ends of the intermediate arm pieces 31, 31. The intermediate arm piece 31 and the end arm piece 32 are formed integrally and continuously. Through holes 33, 33 for pivotal support are formed in the end arm pieces 32, 32 and serve as regions for pivotal connection and support on a lower bracket 9 for tilt. The bifurcated arm portion 3 is formed to have left-right symmetry in a plan upward view of the arm unit A.

A linking portion 4 is formed between the two arm pieces 30, 30 of the bifurcated arm portion 3. The linking portion 4 is formed to be positioned between the end arm pieces 32, 32 of the two arm pieces 30, 30 and in the center of the spacing of the end arm pieces 32, 32. An axial center line La that passes through the diametrical center of the main holding body portion 21 passes through the central position of the spacing of the end arm pieces 32, 32. In the linking portion 4, connection pieces 42, 42 are formed along the horizontal diameter of a substantially ring-shaped accommodation portion 41, and the connection pieces 42, 42 are formed integrally with the end arm pieces 32, 32 of the bifurcated arm portion 3 (see FIGS. 3B, 3C, 3F, and 3G).

A round through hole is formed in the accommodation portion 41, and the inner circumferential side surface 41a of the through hole is formed as a flat cylindrical cavity. A bearing 8 is accommodated and fixed at the inner circumferential side surface 41a. The bearing 8 serves to support rotatably the lower portion of a steering shaft 100. Insertion holes 41c that pass through in the up-down direction from an outer circumferential side surface 41b to the inner circumferential side surface 41a are formed in the accommodation portion 41 (see FIG. 3C).

A total of four insertion holes 41c are formed in the accommodation portion 41, and each insertion hole 41c passes through the inner circumferential side surface 41a of the accommodation portion 41. More specifically, the insertion holes 41c are formed in four locations positioned on both sides of a vertical line Lv passing through a diameter center P of the round inner circumferential side surface 41a of the accommodation portion 41. Pin portions 71, 71 of a circlip 7 having the pin portions 71, 71 that are bifurcated and formed as wave-like curves are inserted into the insertion holes 41c. The bearing 8 is fixed by the two pin portions 71, 71 to prevent the bearing from falling out in the axial direction on the inner circumferential side surface 41a (see FIG. 3E, FIG. 7, etc.). Further, an open cavity portion S is provided between the front end portion of the main holding body portion 21 of the outer column 2, the bifurcated arm portion 3 of the arm unit A, and the linking portion 4.

In another possible embodiment, only a guide groove 223 is formed in the lower surface side of the tightening plate-like piece 221, without forming the tightening through hole 222 in the tightening plate-like piece 221 of the outer column 2 (see FIG. 4). In the guide groove 223, a groove of a substantially semicircular cross-sectional shape is formed along the widthwise direction in the lower end surface of the tightening plate-like piece 221. In the configuration of such an embodiment, only a bolt 51 of the tightening tool 5 passes through the guide groove 223. In such an embodiment, the tightening plate-like piece 221 is miniaturized and the weight of steering apparatus can be reduced.

Figure 1B:
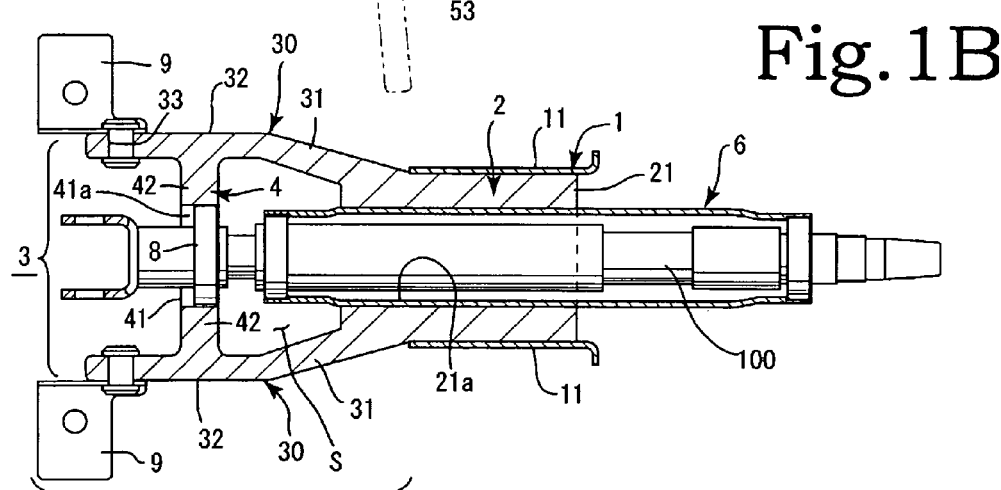
FIG. 1B is a sectional view taken along the Xa-Xa arrow in FIG. 1A.
Figure 1C:
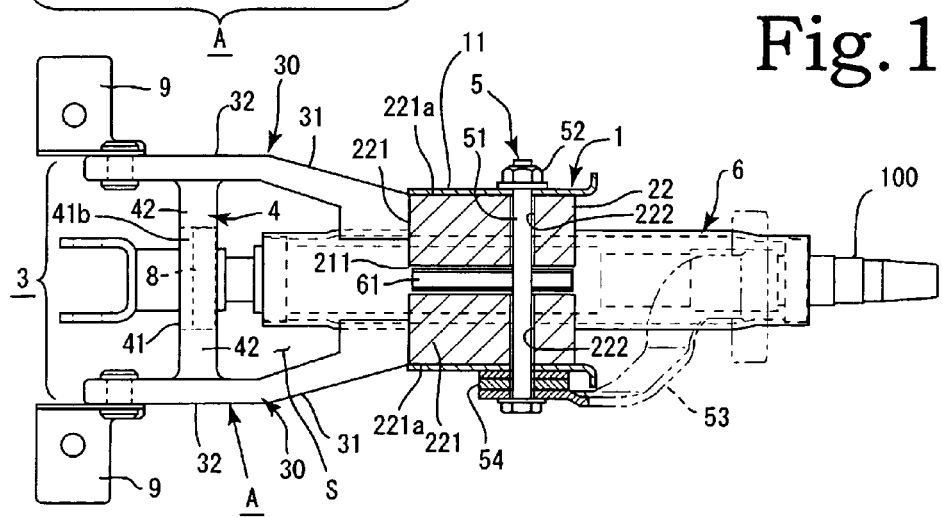
FIG. 1C is a sectional view taken along the Xb-Xb arrow in FIG. 1A.

In a possible embodiment, a rotation stop member 61 is fixedly attached in the diametrically lower portion and on the outer circumference of the inner column 6 (see FIGS. 1A, 1C, and 2B). The rotation stop member 61 is a plate-shaped member in the form of a substantially rectangular parallelepiped with a substantially gate-shaped cross section and is fixedly attached so that the longitudinal direction thereof coincides with an axial direction of the inner column 6. A fixing member such as a screw or welding can be used as a means for fixedly attaching the rotation stop member. It is also possible to cut out part of the inner column 6 and mount the rotation stop member with a fixing member such as a screw so that part of the rotation stop member 61 is exposed to the outside in the cut-out portion.

When the inner column 6 is accommodated and mounted on the main holding unit portion 21 of the outer column 2, the rotation stop member 61 is mounted so as to be accommodated in the divided portion 211. Therefore, the widthwise size of the rotation stop member 61 is less than the smallest distance between the divided end edges 211a, 211a of the divided portion 211, in a state of being tightened by the tightening tool 5. By fixedly attaching the rotation stop member 61 to the inner column 6, it is possible to restrict the inner column 6 so as to prevent the idle rotation thereof around the axis inside the divided portion 211 and prevent the inner column 6 from rotating unnecessarily around the axis with respect to the outer column 2 when the inner column 6 slides along the outer column 2 during telescopic adjustment or the like.

Figure 8A:
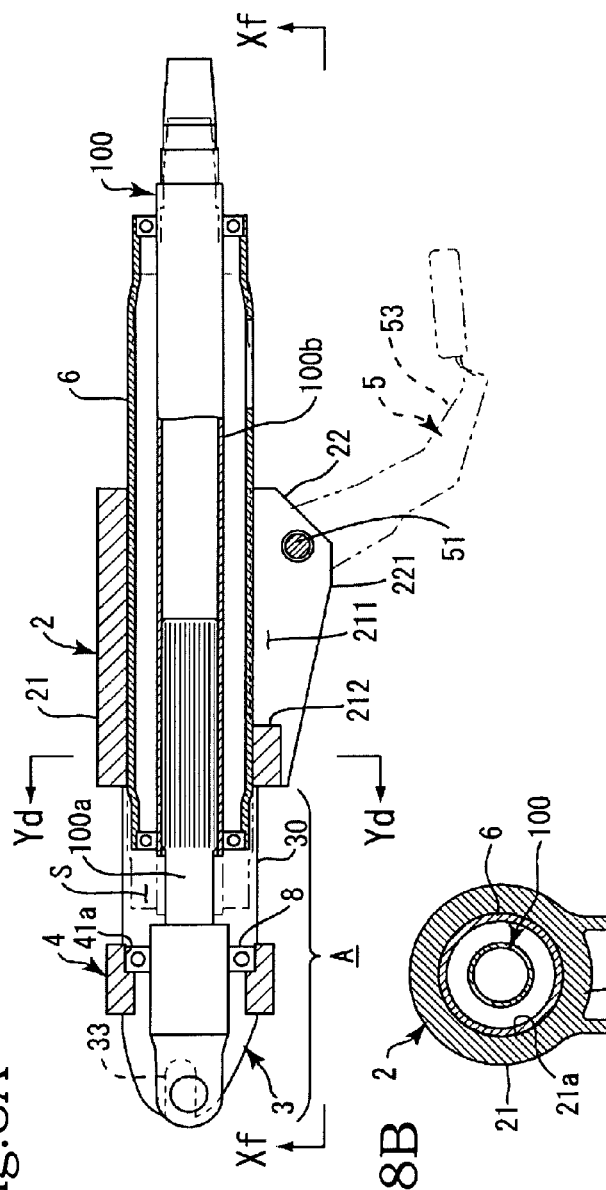
FIG. 8A is a vertical sectional view illustrating the configuration in accordance with the present invention that has a steering support body provided with a circumferential support portion.
Figures 10A, 10B:
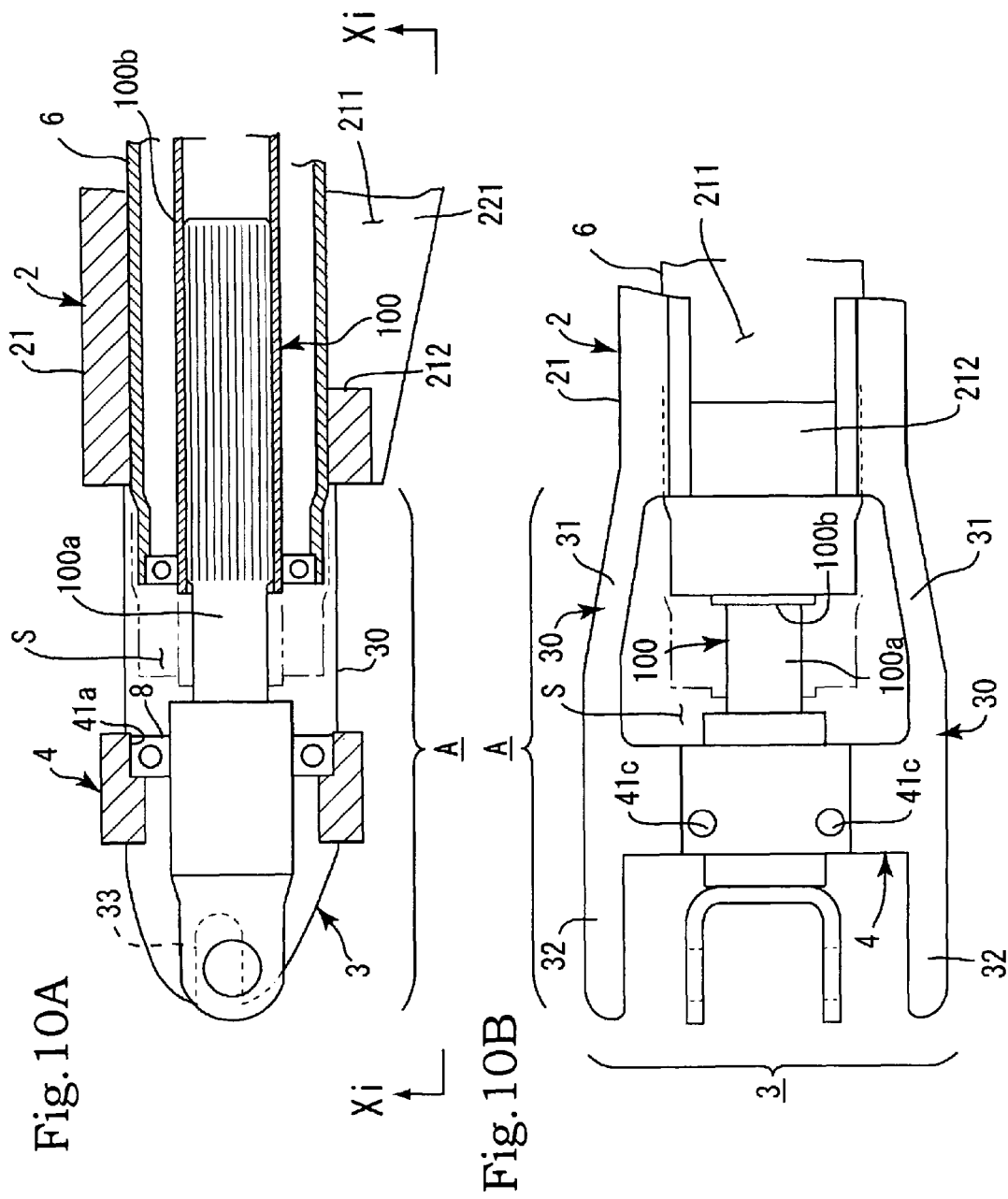
FIG. 10A is a principal enlarged vertical sectional view illustrating the configuration in accordance with the present invention that has a steering support body provided with a circumferential support portion.
FIG. 10B is a sectional view taken along the Xi-Xi arrow in FIG. 10A.

The steering shaft 100 is constituted by a lower shaft 100a and an upper shaft 100b (see FIG. 8A and FIG. 10A). The lower shaft 100a and upper shaft 100b are mated and joined so as to be slidable with each other along the axial direction, and the steering shaft 100 has a structure such that the axial length thereof can be increased of decreased. More specifically, the upper shaft and lower shaft are slidably joined by a spline. The upper shaft 100b of the steering shaft 100 is mounted by means of bearings on both axial end portions of the inner column 6, and the upper shaft 100b is configured to be capable of rotating about the axis with respect to the inner column 6. Further, the lower shaft 100a is rotatably supported by a bearing at the linking portion 4.

The axial front end portion of the upper shaft 100b is in a position substantially identical to that of the axial front end portion of the inner column 6 or slightly protrudes beyond it (see FIG. 10A). The axial front end portion of the inner column 6 protrudes beyond the front end portion of the main holding body portion 21 and moves in the axial direction during telescopic adjustment inside the open cavity portion S between the front end portion of the main holding body portion 21, the bifurcated arm portion 3, and the linking portion 4. As the inner column 6 moves in the axial direction, the upper shaft 100b also moves in the axial direction. Further, the axial front end portion of the upper shaft 100b slides along the lower shaft 100a and moves inside the open cavity portion S (see FIG. 10B).

Figure 8B:
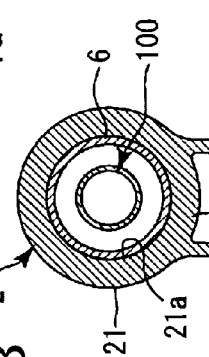
FIG. 8B is a sectional view taken along the Yd-Yd arrow in FIG. 8A.
Figure 8C:
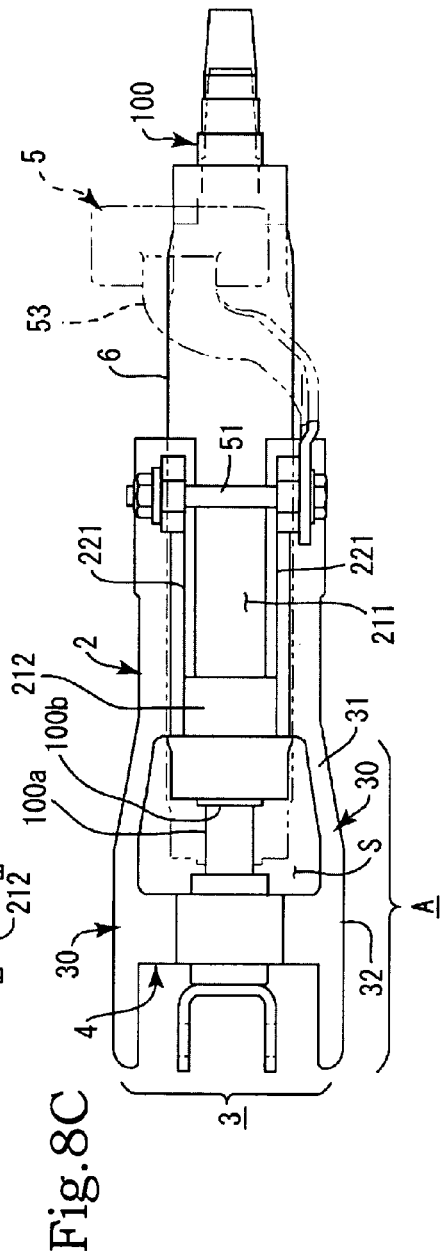
FIG. 8C is a sectional view taken along the Xf-Xf arrow in FIG. 8A.

Further, when the inner column 6 is mounted on the outer column 2 according to the second embodiment, the inner column 6 is supported by the main holding body portion 21 and continuously supported in the circumferential direction of the inner column 6 in the location of the circumferential support portion 212 (see FIG. 8B). More particularly, the circumferential support portion 212 is formed at the axial front end portion of the main holding body portion 21, and the vicinity of the axial front side of inner column 6 is supported over the entire outer circumference. The circumferential support portion 212 also supports the inner column 6 at the axial rear side of the open cavity portion S, and the support rigidity of the inner column 6 in the open cavity portion S is increased.

A method for assembling the main structural components in accordance with the present invention will be described below. The tightening plate-like pieces 221, 221 of the tightening portion 22 of the outer column 2 are inserted between the fixed side portions 11, 11 of the fixed bracket 1 and the bolt 51 of the tightening tool 5 is inserted into the adjustment holes 13, 13 of the two fixed side portions 11, 11 and the tightening through holes 222, 222 that have been formed in the two tightening plate-like pieces 221, 221 and mounted by tightening together with a lock lever portion 53 and a tightening cam 54 by a nut 52. The thickness of the tightening cam 54 in the axial direction of the bolt 51 is changed by the rotation operation of the lock level portion 53.

The rotation operation of the lock level portion 53 generates a tightening force in the entire tightening tool 5, the fixed side portions 11, 11 of the fixed bracket 1 are pushed to bring them closer together, the tightening plate-like pieces 221, 221 of the tightening portion 22 are pushed by the fixed side portions 11, 11, and the tightening plate-like pieces 221, 221 are tightened, whereby the spacing of the divided portion 211 of the main holding body portion 21 of the outer column 2 is reduced, and the inner column 6 mounted on the outer column 2 is locked (fixed) in the axial direction. In this case, the holding inner circumferential side surface portion 21a of the outer column 2 and the outer circumferential side surface of the inner column 6 are in a surface contact state and the inner column is fixed in the axial direction by the increase of the force of friction with the inner column 6.

Where the tightening of the tightening tool 5 is released, the distance between the fixed side portions 11, 11 is increased, the distance between the tightening plate-like pieces 221, 221 is also increased at the same time, locking of the inner column 6 by the outer column 2 is gradually weakened, and the inner column 6 moves in the axial direction. As a result, telescopic adjustment is made possible. At the same time, the outer column 2 can be tilt adjusted by moving up or down together with the bolt 51 of the tightening tool 5 with respect to the adjustment holes 13, 13 of the fixed side portions 11, 11 of the fixed bracket 1.

In accordance with the present invention, the divided portion 211 that is divided along substantially the entire length is formed in the main holding body portion 21 of the outer column 2 along the axial direction therefore. Therefore, when the outer circumference of the inner column 6 is tightened and fixed by the main holding body portion 21, the pushing forces p, p, . . . that tighten the outer circumference of the inner column 6 from diametrically horizontal both sides of the main holding body portion 21 along the axial diction of the divided portion 211 can be made substantially equal and uniform along the axial direction (see FIG. 5A). Therefore, the unevenness of the tightening force along the axial direction of the main holding body portion 21 can be inhibited.

Further, the divided end edges 211a, 211a at both sides in the widthwise direction of the divided portion 211 (direction identical to the horizontal diameter direction of the main holding body portion 21) and both tightening plate-like pieces 221, 221 can be brought close to each other in a parallel state thereof, without displacement. As a result, the outer column 2 can be fixed more stably to the inner column 6 and the tightening force thereof can be further increased.

Further, the arm unit A is formed from an axial end portion of the outer column 2, the bifurcated arm portion 3 with two arms protruding outward in the axial direction of the outer column 2 is formed in the arm unit A, and the linking portion 4 that is formed integrally with the bifurcated arm portion 3 is present between the arms of the bifurcated arm portion 3. Therefore, the strength of the section that is divided along the entire length in the axial direction of the divided portion 211 can be increased. In other words, the bifurcated arm portion 3 with left and right arms connected integrally to the outer column 2 and the linking portion 4 that is formed integrally between the arms of the bifurcated arm portion 3 constitutes a substantially truss-like skeletal structure, as shown in FIG. 5B. As a result, sufficient reinforcement can be provided and the rigidity of the entire steering apparatus can be increased.

Therefore, the operation feeling of steering can be improved by increasing the rigidity when the steering column is fixed in a tilt-telescopic position. In addition, the inner column 6 and steering shaft 100 are supported by the main holding body portion 21 of the outer column 2 and the linking portion 4 of the arm unit A, and the inner column 6 and steering shaft 100 are supported with better stability along the axial direction (see FIG. 5A).

Further, since the circumferential support portion 212 with a continuous inner wall surface in the circumferential direction is formed in the axial front end portion location of the main holding body portion 21, the outer column 2 can support the inner column 6 with higher rigidity and the operation feeling of the steering wheel can be improved. Further, the steering shaft 100 is rotatably supported in the open cavity portion S by the linking portion 4 at the front side in the axial direction and by the main holding body portion 21 at the rear side in the axial direction. Therefore, the steering shaft 100 can be supported with good stability along the axial direction and the telescopic adjustment can be performed smoothly.

What is claimed is:

1. A steering apparatus, comprising:
a fixed bracket having fixed side portions at both sides in a widthwise direction;
an outer column that is swingably mounted on the fixed bracket;
an arm unit;
an inner column;
a steering shaft that is rotatably mounted on the arm unit and the inner column; and
a tightening tool,
wherein the outer column includes a main holding body portion formed in a substantially hollow cylindrical shape, a divided portion that is formed along an axial direction of the main holding body portion, and a tightening portion comprising two tightening plate pieces formed in first and second side locations in a widthwise direction of the divided portion,
the arm unit includes a bifurcated arm portion that extends axially outward in a substantially bifurcated shape at an axial front side of the main holding body portion, and a linking portion formed between arms of the bifurcated arm portion,
the inner column is held by the outer column,
the steering shaft is pivotally supported by the linking portion, and
the two tightening plate pieces of the tightening portion are disposed inside the two fixed side portions of the fixed bracket and tightenably connected by the tightening tool.

2. The steering apparatus according to claim 1, wherein a pivotal support portion serving as a tilt rotation center is provided in the bifurcated arm portion of the arm unit, a bearing portion is provided in the linking portion so as to be coaxial with the main holding body portion, an open cavity portion is provided between the outer column, the bifurcated arm portion, and the linking portion, the steering shaft includes an upper shaft that is rotatably supported by the inner column and a lower shaft that is rotatably supported by the linking portion, the upper shaft and lower shaft being mated and joined so as to be axially slidable with each other, a mating location of the lower shaft and the axial front end portion of the upper shaft is positioned in the open cavity portion, and an axial front end portion of the inner column can move axially in the location of the open cavity portion.

3. The steering apparatus according to claim 2, wherein the divided portion is formed over the entire main holding body portion in the axial direction thereof.

4. The steering apparatus according to claim 2, wherein the divided portion is formed from one end side to an other end side in the axial direction of the main holding body portion except for a portion of the main holding body portion, and a circumferential support portion with an inner wall surface continuous in the circumferential direction is formed at the other end portion in the axial direction of an main holding body portion.

5. The steering apparatus according to claim 2, wherein the bifurcated arm portion is formed such that the spacing thereof gradually increases axially outward from an axial end portion of the outer column.

6. The steering apparatus according to claim 2, wherein a rotation stop member that is inserted into the divided portion and is free to slide is fixedly attached to a diametrically lower portion of the inner column.

7. The steering apparatus according to claim 2, wherein a tightening through hole for the tightening tool is formed in the tightening portion.

8. The steering apparatus according to claim 2, wherein a guiding groove for the tightening tool is formed in a lower end surface of the tightening portion.

9. The steering apparatus according to claim 1, wherein the divided portion is formed over the entire main holding body portion in the axial direction thereof.

10. The steering apparatus according to claim 9, wherein the bifurcated arm portion is formed such that the spacing thereof gradually increases axially outward from an axial end portion of the outer column.

11. The steering apparatus according to claim 9, wherein a rotation stop member that is inserted into the divided portion and is free to slide is fixedly attached to a diametrically lower portion of the inner column.

12. The steering apparatus according to claim 9, wherein a tightening through hole for the tightening tool is formed in the tightening portion.

13. The steering apparatus according to claim 9, wherein a guiding groove for the tightening tool is formed in a lower end surface of the tightening portion.

14. The steering apparatus according to claim 1, wherein the divided portion is formed from one end side to an other end side in the axial direction of the main holding body portion except for a portion of the main holding body portion, and a circumferential support portion with an inner wall surface continuous in the circumferential direction is formed at an other end portion in the axial direction of the main holding body portion.

15. The steering apparatus according to claim 1, wherein the bifurcated arm portion is formed such that the spacing thereof gradually increases axially outward from an axial end portion of the outer column.

16. The steering apparatus according to claim 1, wherein a rotation stop member that is inserted into the divided portion and is free to slide is fixedly attached to a diametrically lower portion of the inner column.

17. The steering apparatus according to claim 1, wherein a tightening through hole for the tightening tool is formed in the tightening portion.

18. The steering apparatus according to claim 1, wherein a guiding groove for the tightening tool is formed in a lower end surface of the tightening portion.

* * * * *